(12) United States Patent
Henderson et al.

(10) Patent No.: US 8,996,000 B2
(45) Date of Patent: Mar. 31, 2015

(54) REAL-TIME LOAD ANALYSIS FOR MODIFICATION OF NEIGHBOR RELATIONS

(75) Inventors: Thomas W. Henderson, Alpharetta, GA (US); Arthur Richard Brisebois, Cumming, GA (US); Fereidoun Tafreshi, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 81 days.

(21) Appl. No.: 13/609,013

(22) Filed: Sep. 10, 2012

(65) Prior Publication Data

US 2014/0073322 A1    Mar. 13, 2014

(51) Int. Cl.
  *H04W 60/00*   (2009.01)
  *H04W 36/00*   (2009.01)
  *H04W 24/02*   (2009.01)

(52) U.S. Cl.
  CPC .................................. *H04W 24/02* (2013.01)
  USPC ......... 455/435.1; 455/522; 455/525; 370/331

(58) Field of Classification Search
  CPC ...... H04W 60/00; H04W 60/04; H04W 36/00
  USPC .................... 455/435.1, 435.2, 435.3, 436
  See application file for complete search history.

(56) References Cited

U.S. PATENT DOCUMENTS

| | | | |
|---|---|---|---|
| 7,224,986 B2 | 5/2007 | Nikolai et al. | |
| 7,957,743 B2 | 6/2011 | Moe et al. | |
| 8,135,416 B2 | 3/2012 | Zhang | |
| 8,155,040 B2 | 4/2012 | Franklin et al. | |
| 2005/0053099 A1 | 3/2005 | Spear et al. | |
| 2007/0109999 A1* | 5/2007 | Brunner | 370/331 |
| 2009/0047961 A1* | 2/2009 | Kim | 455/436 |
| 2009/0264130 A1* | 10/2009 | Catovic et al. | 455/436 |
| 2010/0178912 A1 | 7/2010 | Gunnarsson et al. | |
| 2010/0311407 A1 | 12/2010 | Yao et al. | |
| 2011/0096687 A1* | 4/2011 | Dottling et al. | 370/252 |

(Continued)

OTHER PUBLICATIONS

Feng, "Self-Organizing Networks (SON) in 3GPP Long Term Evolution". Nomor Research GmbH, Munich, Germany, May 20, 2008, 15 pages.

(Continued)

*Primary Examiner* — Kashif Siddiqui
(74) *Attorney, Agent, or Firm* — Amin, Turocy & Watson, LLP

(57) ABSTRACT

Adjusting RAN performance by adapting cell coverage area can help optimize a wireless communications network. RAN topology can be adapted based on analysis of real-time load conditions of RAN base stations. Analysis of the load conditions of RAN base stations can be performed in a core-network of a wireless carrier rather than distributing the analysis to RAN-side elements. Analysis can be based on receiving real-time load information relating to key performance indicators such as X2 load, S1 load, instant outbound handover count, instant inbound handover count, etc. Further, analysis can include the application of predetermined rules relating to preferential performance of the base stations. This can facilitate ranking neighboring base stations, adding new base stations, deleting base stations, black/white listing base stations, etc., in neighbor relations data structures, such as automatic neighbor relations structures for self-organizing networks, e.g., eNodeBs in LTE networks.

20 Claims, 10 Drawing Sheets

(56) References Cited

U.S. PATENT DOCUMENTS

| | | |
|---|---|---|
| 2011/0170518 A1* | 7/2011 | Randriamasy et al. ....... 370/331 |
| 2011/0171952 A1 | 7/2011 | Niu |
| 2011/0176424 A1 | 7/2011 | Yang et al. |
| 2011/0263282 A1 | 10/2011 | Rune et al. |
| 2011/0294527 A1 | 12/2011 | Brueck et al. |
| 2012/0157105 A1 | 6/2012 | Grob-Lipski |
| 2012/0230305 A1* | 9/2012 | Barbu et al. ................... 370/338 |
| 2012/0275315 A1 | 11/2012 | Schlangen et al. |
| 2013/0244718 A1* | 9/2013 | Lee et al. ...................... 455/525 |
| 2013/0295938 A1 | 11/2013 | Yamine |

OTHER PUBLICATIONS

Amirijoo, et al., "Neighbor Cell Relation List and Physical Cell Identity Self-Organization in LTE". Wireless Access Networks, Ericsson Research, Ericsson AB, Sweden, 5 pages.

Non-Final Office Action dated Sep. 12, 2013 for U.S. Appl. No. 13/609,026, 25 pages.

Non-Final Office Action dated Nov. 19, 2013 for U.S. Appl. No. 13/609,038, 26 pages.

Non-Final Office Action dated Apr. 10, 2014 for U.S. Appl. No. 13/609,026, 22 pages.

Non-Final Office Action dated Jun. 3, 2014 for U.S. Appl. No. 13/609,038, 23 pages.

Non-Final Office Action dated Jun. 19, 2014 for U.S. Appl. No. 13/609,051, 35 pages.

* cited by examiner

REAL-TIME LOAD ANALYSIS FOR MODIFICATION OF NEIGHBOR RELATIONS

TECHNICAL FIELD

The disclosed subject matter relates to radio area network coverage and, more particularly, to adaptive radio area network coverage.

BACKGROUND

By way of brief background, coverage area conditions for a radio area network (RAN) can be predicated on topological and topographical features of the deployed RAN equipment, including base stations, e.g., NodeB or enhanced NodeB (eNodeB). A RAN can be comprised of a number of cells, each associated with a base station, e.g., a NodeB/eNodeB. Mobile devices can traverse the RAN by sequentially establishing communications links with the base stations. Generally speaking, the closer a base station is to a mobile device, the higher quality the communications link will be, all else being equivalent, because the communications signals between the base station and the mobile device have a shorter distance to traverse; however, numerous other factors can impact the performance of elements of a RAN.

DETAILED DESCRIPTION

Figure 1:
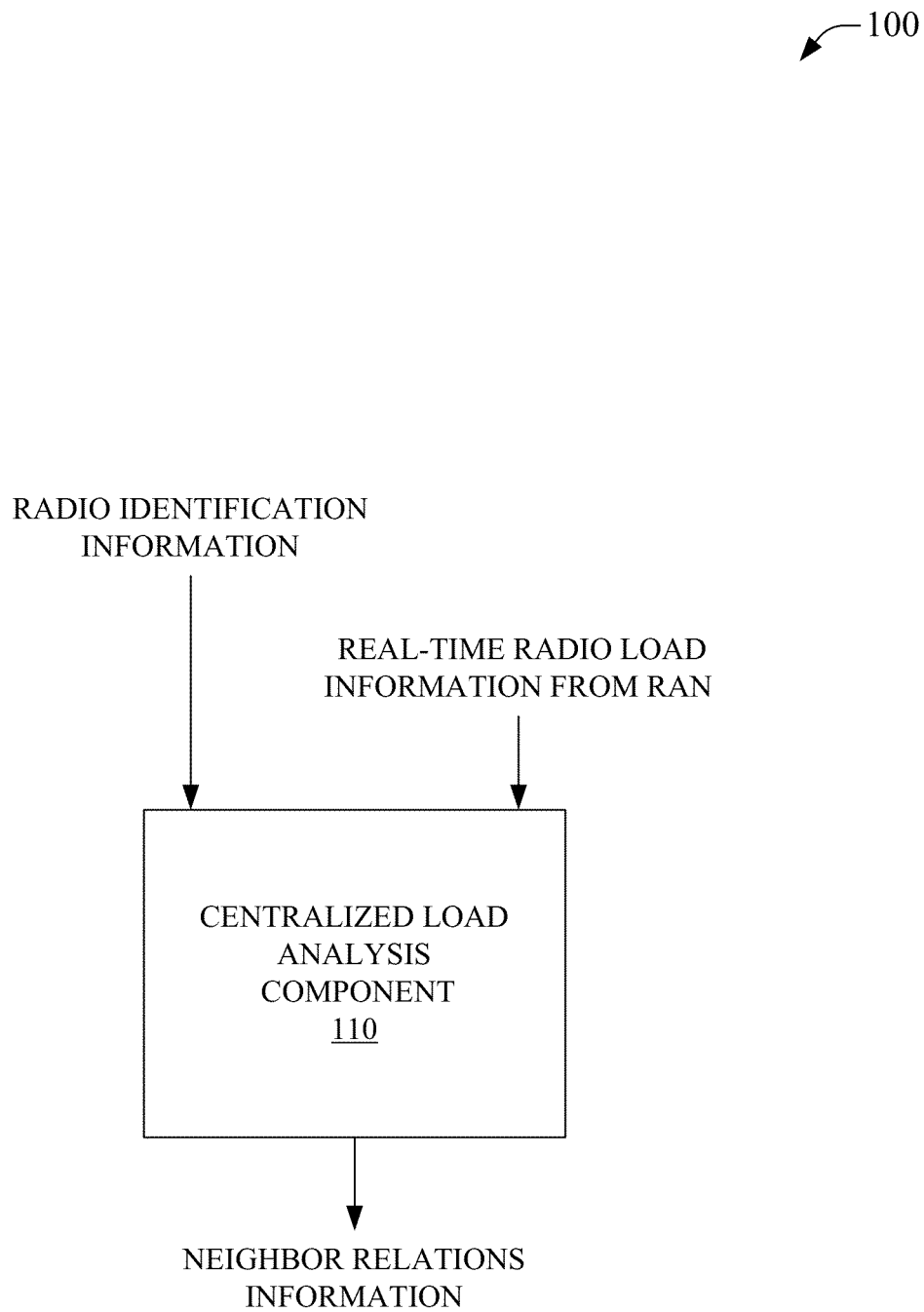
FIG. 1 is an illustration of a system that facilitates modification of neighbor relations based on centralized determination of load conditions of neighbor base stations in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Adjusting RAN performance by adapting cell coverage area can help optimize the operating efficiency of a wireless network. Adjusting the selection of neighboring base stations based on the real-time performance of base stations can result in improvements in the performance of a wireless communications network. As used in herein, the term "real-time" can relate to present, instant, recent, current, substantially current, updated, or other types of information that are accessible immediately or nearly immediately after collection. In an aspect, use of real-time information can allow a computer to respond to situations as they occur. As an example, selecting better performing base stations as neighbors, e.g., better load conditions, lower outgoing and incoming handover requests, etc., can result in selection of base station combinations providing improved performance. As a second example, where an unplanned outage of a base station, e.g., an eNodeB, occurs, adjusting nearby base station coverage areas by selecting high performing base stations to provide post-outage RAN coverage can mitigate the effects of the outage.

Conventionally, collected load measurements can be manually subjected to analysis techniques to determine information, which can then separately be employed in adaptation of the RAN or planning deployment of resources to improve the performance of the RAN. Moreover, modern decentralized control processes that are becoming increasingly common in RAN operations, e.g., Long Term Evolution (LTE) cellular technologies can specify substantially more decentralized operations, such as Automatic Neighbor Relations (ANR) at each eNodeB, than preceding wireless network technologies can create difficulties in employing performance analysis and selection process in that the scope of load analysis can be localized to the base station in contrast to a larger network load analysis that can be more effective at deploying wider corrections of the RAN coverage area. As such, it can be desirable to provide tools that can determine information that can be employed in adapting coverage area conditions in a more automated manner. Further, it can be desirable to employ a centralized real-time load performance analysis that can be employed even in a more modern decentralized control environment. In an aspect, centralized analysis can be related to performing an analysis at a centralized system, component, device, etc. As such the term "centralized", as used herein, generally relates to an analysis performed at a core-network level of a wireless communications system, e.g., at components or systems that can manage or facilitate control of a plurality of base station devices of the wireless communications system, such as at a core-network controller of a RAN including a plurality of base stations.

PCIs are widely used to help identify sector carriers, e.g., eNodeBs, because they consume fewer resources to transmit than a truly unique identifier, e.g., global cell identity (GCI)

identifiers. As such, there can be instances where two base stations employ the same PCI in overlapping geographic regions resulting in an identification conflict, e.g., a PCI conflict. The conflict relates to each physical sector carrier of a base station having no more than one neighbor base station using a specific PCI. Where a serving base station has two or more neighbor base stations with the same PCI the serving base station can be unable to identify which neighbor base station to transfer a user equipment to during an event such as a handover. Ultimately, the identification conflict can result in the handover failing, because the two potential handover candidate base stations are not distinguishable from each other based on the PCI. Employing historical performance analysis can allow for selection of historically better performing base stations in a PCI conflict condition.

Adapting cell coverage area in an automated manner, such as by integration with planning components and management components can be employed to, for example, anticipate future deployment of base stations to improve coverage areas, prioritization of base stations to improve coverage balance, etc. Real-time load information on coverage area patterns of base stations in a RAN can be employed, for example, to perform analysis of statistical coverage conditions for cells in a RAN, analysis of coverage areas as they relate to performance metrics, analysis of coverage areas with regard to specific event such as handovers, etc.

Mobile reporting components, e.g., user equipments (UEs), can be used to report detected base stations to automatic neighbor relations (ANR) components to facilitate selection of neighboring base stations in accordance with selection criteria and rules. In an aspect, UEs can report detected PCIs. Where an identification conflict can occur in conjunction with modification of available neighbor base stations, corrective measures can be employed to reduce PCI conflicts in conjunction with employing load analysis for modification of neighboring base station relations.

In an aspect, neighbor relations between base stations can relate to neighbor relations between sector carriers of the base stations. Sector carriers can include one or more radios embodying one or more radio access technologies. Further, sector carriers can include one or more radios operating at one or more frequencies. A radio can include one or more antenna. As such, sector carriers of a base station can be separately associated with neighbor relations information associated with a relationship between said sector carriers. As an example, base station "A" can serve several sectors, such as sectors 1 to 3. A second base station, "B", can serve several sectors, such as sectors 4 to 9. Neighbor relations can be between the radios of the base stations serving specific sectors, for example, between the radios serving sector A-2 (base station A, sector 2) and sector B-9 (base station B, sector 9), etc. In some embodiments, neighbor relations information for a base station can include, for example, neighbor relations information for one or more sector carrier pairs.

Where, for one base station, it is not permissible to have neighbor relationships towards two other base stations employing the same PCI, modification of the neighbor relations can be based on real-time load information. As an example, when a UE detects a new neighbor base station with the same PCI of an existing neighbor base station, the UE can have already entered the overlapping coverage of the new neighbor base station. If handover does not occur, the new neighbor base station can become an interferer in the downlink direction and the UE can become an uplink interferer towards the new neighbor. This example scenario can lead to dropped calls. However, when the new neighbor is detected, if the UE reports the new neighbor back towards the serving base station, then centralized real-time load information can be employed to selectively retain high performing base stations rather than adopting the newly detected base station, drop poor performing base stations in favor of the newly detected base station, etc. Centralized real-time load information analysis for modification of neighbor relations, e.g., the selection order of base stations as neighboring base stations, can include neighbor prioritization, neighbor deletion, neighbor addition, alarm conditions, etc.

Further, the automated collection of load information to analyze RAN coverage conditions can facilitate adaptation of a RAN in real-time. In an aspect, adaptation of the RAN can include prioritization of base stations in neighbor relations technologies, e.g., Automatic Neighbor Relation (ANR) detection for self-organizing networks (SON) in Long Term Evolution (LTE) wireless radio technologies, etc. This can further apply to ranking new potential neighbors. This can also apply to ranking existing neighbors, e.g., for preferential selection, retention, deletion, etc. Still further, real-time load information can be employed in RAN planning systems to promote evolution of RAN coverage according to one or more rules. Similarly, real-time load information can be employed for other purposes such as throwing alerts when RAN coverage diverges sufficiently from established parameters, deployment of maintenance services, sourcing information employed in automated mechanical adjustment of elevation, azimuth, or transmit power levels of base stations, etc., without departing from the present scope of the disclosure. The centralized analysis of real-time load information can be cooperative with other decentralized control processes that are expected to become more common as wireless radio control systems evolve.

The following presents simplified example embodiments of the disclosed subject matter in order to provide a basic understanding of some aspects of the various embodiments. This is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an embodiment, a system can include a processor and memory. The processor can facilitate control of a plurality of base station devices of a wireless communications system. The processor can further facilitate the execution of computer-executable instructions stored on the memory. The execution of the computer-executable instructions can cause the processor to receive radio information related to an identification of a radio in a wireless communications system. The processor can further receive current performance information related to the radio. Moreover, the processor can determine an update for neighbor base station relation information, based on an analysis of the current performance information, to facilitate an adaptation of a coverage area of the wireless communication system based on relation information for a set of neighbor base station relations. The processor can then facilitate access to the update for the neighbor base station relation information.

In another embodiment, a method can include receiving, by a system including a processor and facilitating control of a plurality of base station devices of a wireless communications system, radio identification information for a base station device of a wireless communications network, radio identification information for a base station device of the wireless communications network, wherein the base station device is a neighbor base station device to a serving base station device. The method can include receiving, by the system, substantially current performance information related to the base station device. The method can further include determining, by the system, an update for a neighbor base station relation information, based on analyzing the substantially current performance information. Furthermore, the method can include facilitating adapting a coverage area of the wireless communication system based on the update and relation information for a set of neighbor base station relations and facilitating, by the system, access to the update for the neighbor base station relation information.

In a further embodiment, a device can include a memory storing computer-executable instructions and a processor that facilitates execution of the computer-executable instructions. The processor can facilitate control of a plurality of base station devices of a wireless communications network. These instructions can cause the processor to receive updated performance information related to a plurality of radios of the wireless communications network. The processor can also determine an update for neighbor base station relation information, based on an analysis of the updated performance information, to facilitate an adaptation of a topology of the wireless communication system based on a set of neighbor base station relations. Moreover, the processor can receive radio information related to identification of a radio of the plurality of radios of the wireless communications system. Additionally, the processor can receive a subset of the update for neighbor base station relation information, the subset related to the identified radio of the plurality of radios. In an aspect, the processor can then facilitate access to the subset of the update for neighbor base station relation information.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages and novel features of the disclosed subject matter will become apparent from the following detailed description when considered in conjunction with the provided drawings.

FIG. 1 is an illustration of a system 100, which facilitates modification of neighbor relations based on centralized determination of load conditions of neighbor base stations in in accordance with aspects of the subject disclosure. System 100 can include centralized real-time load analysis component (CLAC) 110. CLAC 110 can receive radio identification information. Radio identification information can include identification information for a wireless network base station, e.g., an eNodeB, etc. Identification information can include a PCI, a GCI, etc.

Radio identification information can further include neighbor relations information, e.g., neighbor base station relation information such as an ANR data structure in an LTE environment, etc. An ANR data structure can include information describing the topological relations of neighbor base stations of a wireless communications network. An ANR data structure can be, for example, in the form of a list, a table, etc. As an example, an ANR table can include information describing the topology of base stations neighboring a serving base station. Where, in the example, there are several neighbor base stations, the ANR table can include the preferential selection order of the neighbor base stations to preferentially select neighbor base stations for UE handover as a UE exits the coverage area of a serving base station. Selection of a high performing base station for handover can decrease the likelihood that the handover will fail severing the communication link with the UE.

Moreover, CLAC 110 can receive real-time radio load information. Radio load information can include performance information for a base station of a wireless communications network. As an example, load information can be calculated for one or more radio access technology (RAT) layers or frequency layers over varying bandwidths. These example load information calculations can benefit from consistent criterion to facilitate, for example, ordering or ranking of the neighbor relations. As a non-limiting more specific example, load can be based on a measured number of active users in relation to a predetermined carrier bandwidth adjusted with a predetermined technology efficiency factor, etc. In an aspect, CLAC 110 can employ received radio identification information to request radio load information corresponding to an identified base station. Radio load information can be received at CLAC 110 from a data source that is remote to CLAC 110. As an example, radio load information can be received on a wireless communications network core component comprising CLAC 110, e.g., CLAC 110 can reside in a component in a control center rather than residing in a RAN-level component, such as an eNodeB, etc.

CLAC 110 can analyze radio load information to determine neighbor relations information, e.g., neighbor base station relations information. Analysis by CLAC 110 can be related to a base station identified in radio identification information. As such, CLAC 110 analysis can be related to base stations included in an ANR data structure. CLAC 110 analysis can include analysis to determine, for example, a high performing base station, ranking a base station, determining a poor performing base station, identifying a base station for a 'black list', e.g., a base station that should be avoided as a neighbor where available, or a 'white list', e.g., a base station that should be included as a neighbor where available, etc.

In an aspect, real-time load analysis can employ key performance indicators (KPIs). KPIs can include, but are expressly not limited to, X2 load, S1 load, instant outbound handovers, instant inbound handovers, etc. Further, load analysis can include weighting. Weighting can be applied to individual KPIs, to combined KPI analysis, or combinations thereof. As an example, a weighting can increase/decrease the effect of a load characteristic relative to the weighting of an inbound handover characteristic. Numerous other KPIs are not enumerated for clarity and brevity though all current or future KPIs are considered within the scope or the subject disclosure.

In an aspect, real-time profiles of base stations can be developed based on real-time load analysis. A base station profile can be received in response to identification of a base station by way of receiving radio identification information at CLAC 110. The use of a profile can facilitate rapid employment of remotely computed real time load analysis for the indicated base station. This aspect can be particularly useful for real-time load analysis for a plurality of base stations such that the real-time load analysis for any of the plurality is instantly available simply by identifying the base station of interest. As such, centralized load analysis can readily compile profiles for one or more base stations in a RAN. These base station profiles can then be readily accessed to modify neighbor reactions information by way of CLAC 110. Centralization of profile development in core-network components can be advantageous over distributing profile development in a RAN-level environment in that, for example, in centralized profile development base station profiles are not duplicated across multiple base stations, a base station profile will be the same even when accessed by multiple requestors (no synchronization of profile instances among different base stations), etc. A centralized profile can also reflect more complete analysis of relevant information in that the performance of the base station can be compiled based on the interaction of the base station with numerous neighbor base stations in contrast to a local profiles at each eNodeB that can be subject to more limited access to information, e.g., only basing the local profile on interaction with a subset of all the neighbor base stations of the profiled base station.

CLAC 110 can determine neighbor relations information. Neighbor relations information can be employed to modify the preferential selection of a neighbor base station, add a base station, delete a base station, flag a base station, black-list or white-list a base station, etc. In an aspect, neighbor relations information can be associated with modification of an ANR data structure, e.g., an ANR list can be updated to reflect new neighbor base stations, remove existing neighbor base stations, reorder base station selection preference order of the ANR list, etc.

Figure 2:
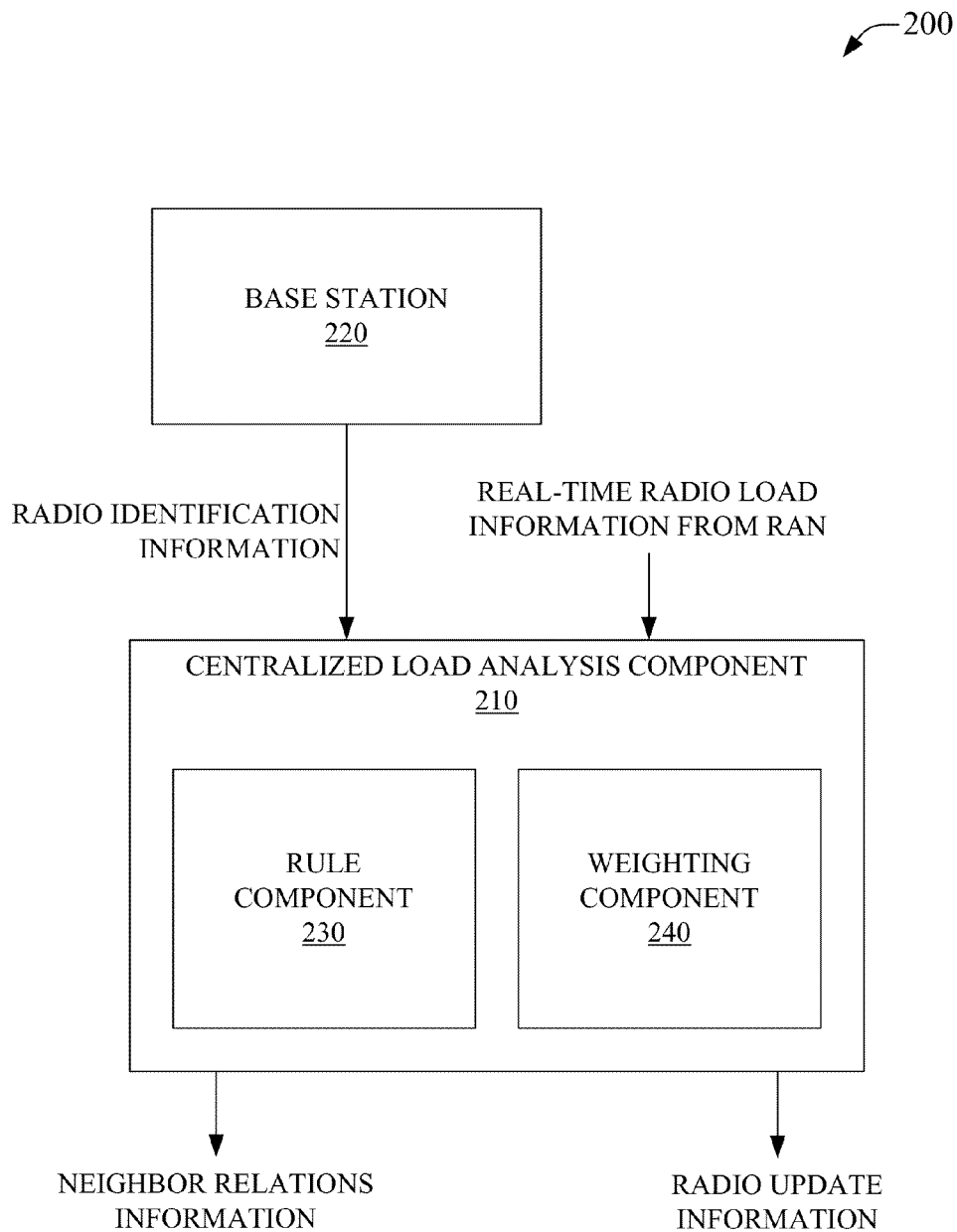
FIG. 2 is a depiction of a system that facilitates modification of neighbor relations based on centralized determination of load conditions of neighbor base stations and conflict resolution in accordance with aspects of the subject disclosure.

FIG. 2 is a depiction of a system that facilitates modification of neighbor relations based on centralized determination of load conditions of neighbor base stations and conflict resolution in accordance with aspects of the subject disclosure. System 200 can include CLAC 210. CLAC 210 can receive radio identification information from base station 220. Base station 220 can be an eNodeB of a wireless communications network such as a cellular network. Radio identification information can include identification information for a wireless communications network base station. Radio identification information can further include neighbor relations information.

CLAC 210 can receive real-time radio load information. Radio load information can include load information for a base station of a wireless communications network. In an aspect, CLAC 210 can employ received radio identification information to request radio load information corresponding to an identified base station, e.g., base station 220.

CLAC 210 can analyze radio load information to determine neighbor relations information, e.g., neighbor base station relations information. Analysis by CLAC 210 can be related to a base station identified in radio identification information, e.g., base station 220, neighbors of base station 220 (such as those in an ANR list), etc. As such, CLAC 210 analysis can be related to base stations included in an ANR data structure.

CLAC 210 can include rule component 230. Rule component 230 can facilitate employing rules to effect real-time load analysis. Rule component 230 can include a rule engine, not illustrated, that can generate a rule for analysis of radio load information. Rule component 230 can also facilitate receiving a rule related to the analysis of radio load information. In an aspect, rules sets can be received by rule component 230. Receiving rules at rule component 230 can facilitate updating the analysis of radio load information. Rules, for example, can relate to analysis to determine a high performing base station, ranking a base station, determining a poor performing base station, identifying a base station for a 'black list' or a 'white list', etc.

CLAC 210 can further include weighting component 240. Weighting component 240 can facilitate application of weighting to individual KPIs, to combined KPI analysis, or combinations thereof. Weighting can increase or decrease the effect of a KPI in a real-time load analysis In a further aspect, CLAC 210 can facilitate the determination of profiles of base stations based on real-time load analysis. A base station profile can be received in response to identification of a base station by way of receiving radio identification information at CLAC 210. The use of a profile can facilitate rapid employment of real-time load analysis for the indicated base station.

CLAC 210 can determine neighbor relations information. Neighbor relations information can be employed to modify the preferential selection of a neighbor base station, add a base station, delete a base station, flag a base station, black-list or white-list a base station, etc. In an aspect, neighbor relations information can be associated with modification of an ANR data structure, e.g., an ANR list can be update to reflect new neighbor base stations, remove existing neighbor base stations, reorder base station selection preference order of the ANR list, etc.

CLAC 210 can further determine radio update information. Radio update information can be used to update radio information, including radio identification information, radio parameters such as elevation/azimuth/power, etc. As an example, radio update information can include designation of a new PCI for a base station to facilitate resolution of a PCI conflict.

Figure 3:
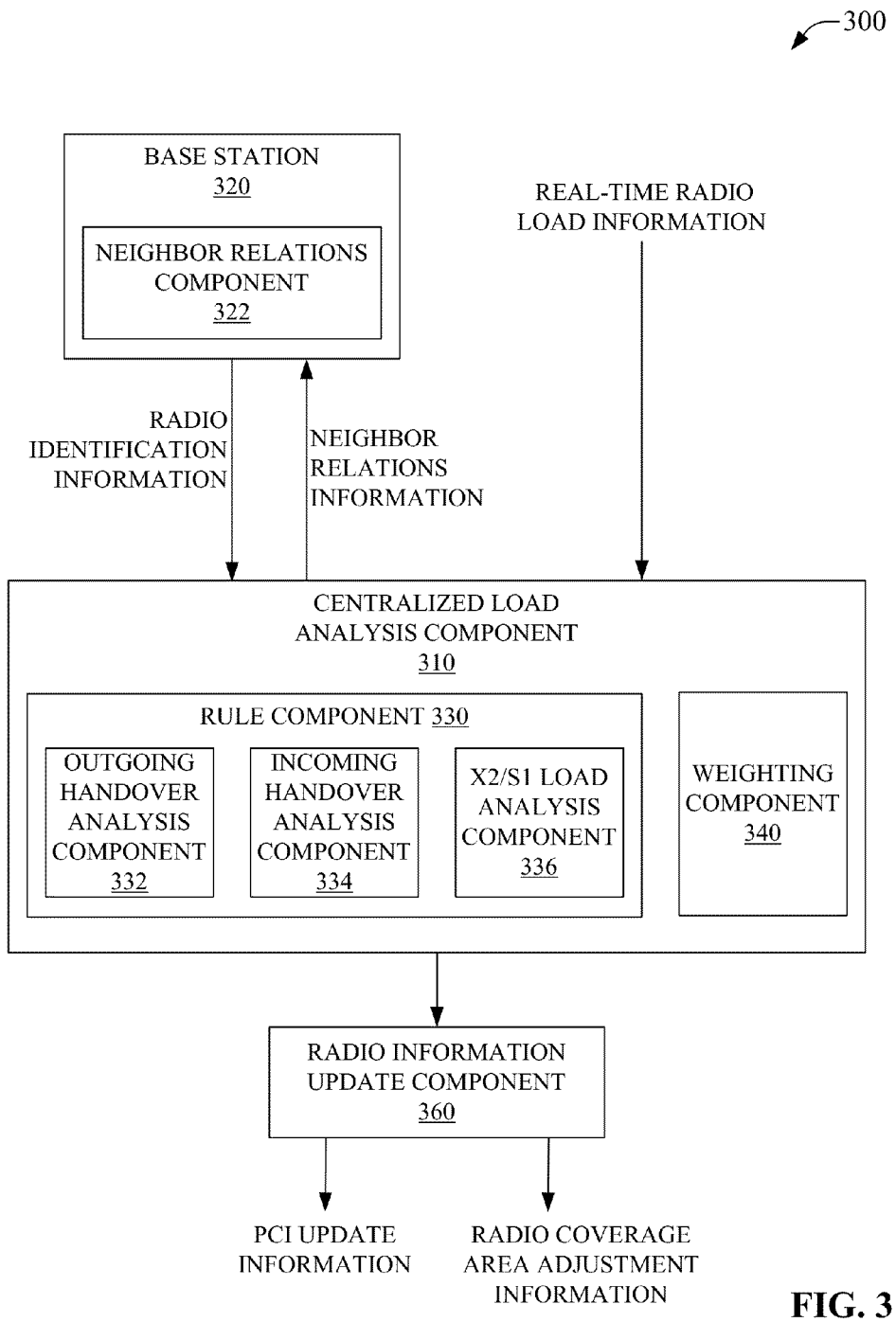
FIG. 3 illustrates a system that facilitates modification of neighbor relations based on centralized determination of load conditions of neighbor base stations, conflict resolution, and coverage area adjustment, in accordance with aspects of the subject disclosure.

FIG. 3 illustrates a system 300 that facilitates modification of neighbor relations based on centralized determination of load conditions of neighbor base stations, conflict resolution, and coverage area adjustment, in accordance with aspects of the subject disclosure. System 300 can include CLAC 310. CLAC 310 can receive radio identification information from base station 320. Base station 320 can be an eNodeB of a wireless communications network such as a cellular network. Radio identification information can include identification information for a wireless communications network base station. Base station 320 can further include neighbor relations component 322. Neighbor relations component 322 can facilitate access to neighbor relations information for base station 320. As such, radio identification information can further include neighbor relations information. CLAC 310 can determine neighbor relations information. Neighbor relations information can be employed to modify the preferential selection of a neighbor base station, add a base station, delete a base station, flag a base station, black-list or white-list a base station, etc. In an aspect, neighbor relations information can be associated with modification of an ANR data structure, e.g., an ANR list can be update to reflect new neighbor base stations, remove existing neighbor base stations, reorder base station selection preference order of the ANR list, etc. Neighbor relations information can be received by base station 320 by way of CLAC 310, as illustrated. Neighbor relations information can be employed by neighbor relations component 322 to update neighbor relations information for base station 320.

CLAC 310 can receive real-time radio load information. Radio load information can include load information for a base station of a wireless communications network. In an aspect, CLAC 310 can employ received radio identification information to request radio load information corresponding to an identified base station, e.g., base station 320.

CLAC 310 can analyze radio load information to determine neighbor relations information, e.g., neighbor base station relations information. Analysis by CLAC 310 can be related to a base station identified in radio identification information, e.g., base station 320, neighbors of base station 320 (such as those in an ANR list by way of neighbor relations component 322), etc. As such, CLAC 310 analysis can be related to base stations included in an ANR data structure.

CLAC 310 can include rule component 330. Rule component 330 can facilitate employing rules to effect a real-time load analysis. Rule Component 330 can include a rule engine, not illustrated, that can generate a rule for analysis of radio load information. Rule component 330 can also facilitate receiving a rule related to the analysis of radio load information. In an aspect, rules sets can be received by rule component 330. Receiving rules at rule component 330 can facilitate updating the analysis of radio load information.

Further, rule component 330 can include outgoing handover analysis component 332. Outgoing handover analysis component 332 can include one or more rules for real-time load analysis related to instant outgoing handovers related to base station 320 or neighbors thereof, e.g., by accessing a neighbor relations data structure, such as an ANR list, for a list of neighbors to base station 320.

Additionally, rule component 330 can include incoming handover analysis component 334. Incoming handover analysis component 334 can include one or more rules for real-time load analysis related to instant incoming UE handovers corresponding to base station 320 or neighbors thereof, e.g., by accessing a neighbor relations data structure, such as an ANR list, for a list of neighbors to base station 320.

Moreover, rule component 330 can include X2/S1 load analysis component 336. X2/S1 load analysis component 336 can include one or more rules for real-time load analysis related to the X2-type or S1-type load conditions corresponding to base station 320 or neighbors thereof, e.g., by accessing a neighbor relations data structure, such as an ANR list, for a list of neighbors to base station 320.

The rules employed by rule component 330, for example, can relate to analysis to determine a high performing base station, ranking a base station, determining a poor performing base station, identifying a base station for a 'black list' or a 'white list', etc. Real-time load analysis can employ KPIs as herein disclosed.

CLAC 310 can further include weighting component 340. Weighting component 340 can facilitate application of weighting to individual KPIs, to combined KPI analysis, or combinations thereof. Weighting can increase or decrease the effect of a KPI in a real-time load analysis In a further aspect, CLAC 310 can facilitate the determination of profiles of base stations based on real-time load analysis. A base station profile can be received in response to identification of a base station by way of receiving radio identification information at CLAC 310. The use of a profile can facilitate rapid access to real-time load analysis for the indicated base station.

CLAC 310 can be communicatively coupled to radio information update component 360. Radio information update component 360 can determine radio update information. In an aspect, radio update information can be used to update radio identification information such as PCI information by facilitating access to PCI update information. In another aspect, radio update information can be used to update radio parameters such as elevation/azimuth/power, etc., by facilitating access to radio coverage area adjustment information. As an example, radio coverage area adjustment information can facilitate decreasing the tilt of a base station antenna to decrease the radio coverage area and reduce overlap with other radio coverage areas of other radios. This example can therefore reduce interference between radios.

Figure 4:
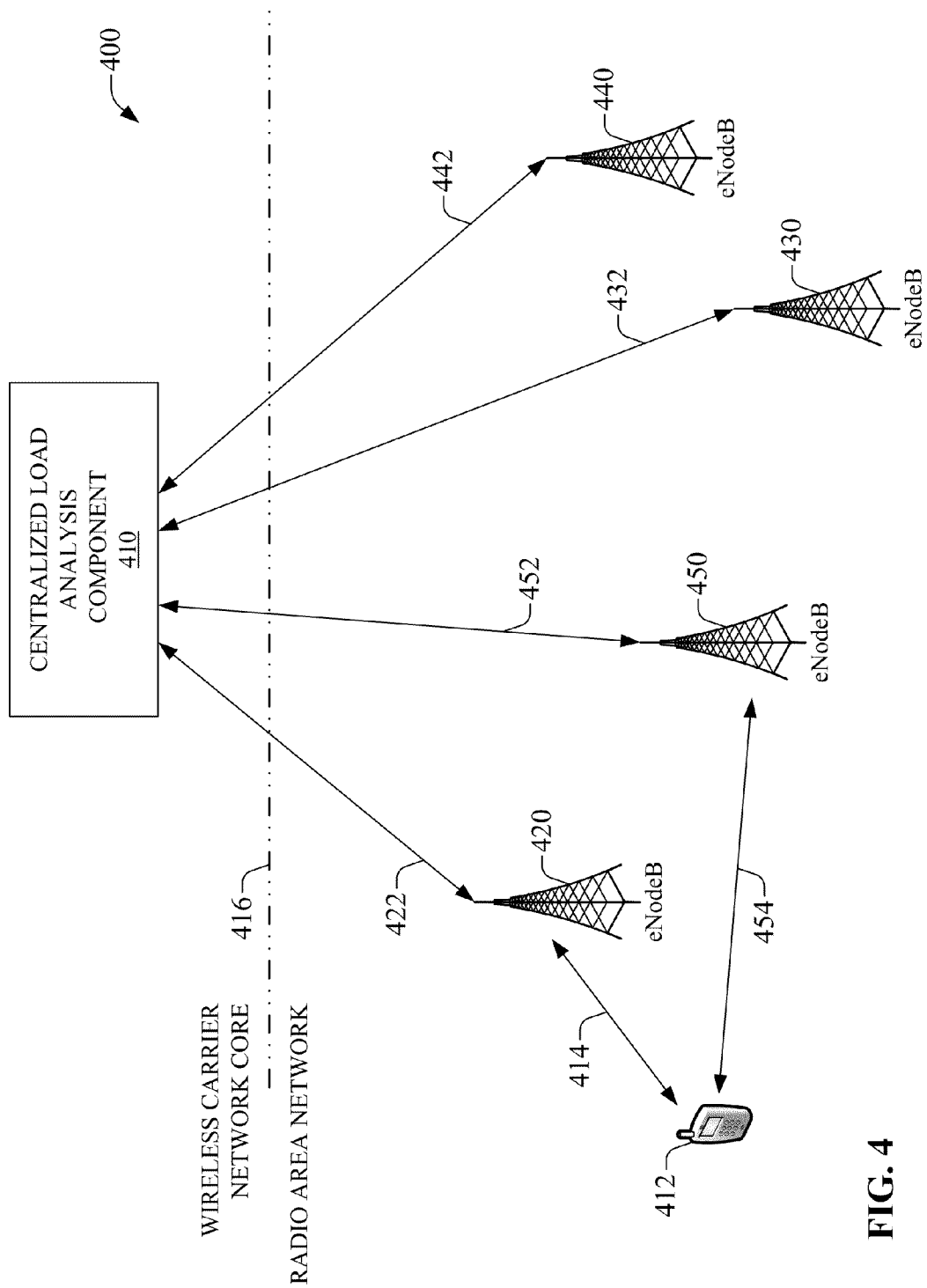
FIG. 4 is a graphic of RAN conditions related to modification of neighbor relations based on centralized determination of load conditions of neighbor base stations in accordance with aspects of the subject disclosure.

FIG. 4 is a graphic 400 of RAN conditions related to modification of neighbor relations based on centralized determination of load conditions of neighbor base stations in accordance with aspects of the subject disclosure. Graphic 400 illustrates several neighboring base stations, eNodeB 420, 430, and 440, communicatively coupled to CLAC 410 by way of communication links 422, 432, and 442 respectively. CLAC 410 can be located in a wireless carrier network core rather than being deployed in a RAN-level system or component as illustrated by demarcation 416. CLAC 410 can determine neighbor relations information. Neighbor relations information can be employed to modify the preferential selection of a neighbor base station, add a base station, delete a base station, flag a base station, black-list or white-list a base station, etc. In an aspect, neighbor relations information can be associated with modification of an ANR data structure, e.g., an ANR list can be update to reflect new neighbor base stations, remove existing neighbor base stations, reorder base station selection preference order of the ANR list, etc. Graphic 400 illustrates an example centralized deployment of CLAC 410 in contrast to the generally decentralized control structure more generally associated with locating control components in the RAN-level of a wireless carrier network, e.g., locating control components at eNodeBs of a RAN.

UE 412 can be served by eNodeB 420, as illustrated by communication link 414. eNodeB 420 can be communicatively coupled to CLAC 410 by communication link 422. As such, eNodeB 420 can facilitate CLAC 410 receiving radio identification information identifying eNodeB 420. Further, eNodeB 420 can facilitate CLAC 410 receiving radio identification information identifying neighbor relations for eNodeB 420, e.g., neighbor relations with eNodeB 430 and eNodeB 440. CLAC 410 can therefore determine neighbor relations information for eNodeB 420, 430, and 440 based on centralized real-time load analysis of neighbor base stations, as disclosed herein. This neighbor relations information can be employed to update the neighbor relations among eNodeB 420, 430, and 440. As an example, a handover of UE 412 from serving base station eNodeB 420 to either eNodeB 430 or eNodeB 440 can typically be directed to the nearer base station (eNodeB 430) because handover between closer base stations can often be better than handover between more distant base stations due to attenuation of signal, etc. However, continuing the example, modification of neighbor relations based on centralized real-time load analysis of neighbor base stations can cause preferential selection of eNodeB 440 over eNodeB 430, even where eNodeB 430 is closer to eNodeB 420, for a handover of UE 412 from serving base station eNodeB 420 where eNodeB 440 has a higher determined historical performance than that of eNodeB 430. As an example, where eNoldeB 430 has a significantly heavier load of provisioned resources in contrast to eNodeB 440 that can be lightly loaded, can result in preferentially ranking eNodeB 440 as more favorable than eNodeB 430 for a handover event.

Graphic 400 also includes eNodeB 450. eNodeB 450 can be a newly deployed base station of the RAN. eNodeB 450 can be detected by UE 412. UE 412 can report a new potential neighbor base station by way of communication link 414 to eNodeB 420. eNodeB 420 can make identification information for eNodeB 450 available to CLAC 410. Centralized real-time load analysis of eNodeB 450 can result in modification of neighbor relations of the RAN. As an example, eNodeB 450 can be added to a neighbor relations list and communication link 452 can be established. Where eNodeB 450 is added to the neighbor relations of eNodeB 420, handover of UE 412 to eNodeB 450 can be preferentially selected to establish communication link 454. As a further example, eNodeB 450 can be acknowledged but not put on a neighbor relations list in favor of keeping eNodeB 430 and eNodeB 440 as preferentially selectable neighbors to eNodeB 420 based on the real-time load analysis of eNodeB 430 and eNodeB 440. Numerous other examples of modification of neighbor relations can be presented and are considered within the scope of the present disclosure but are reserved simply for reasons of clarity and brevity.

In view of the example system(s) described above, example method(s) that can be implemented in accordance with the disclosed subject matter can be better appreciated with reference to flowcharts in FIG. 5-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

Figure 5:
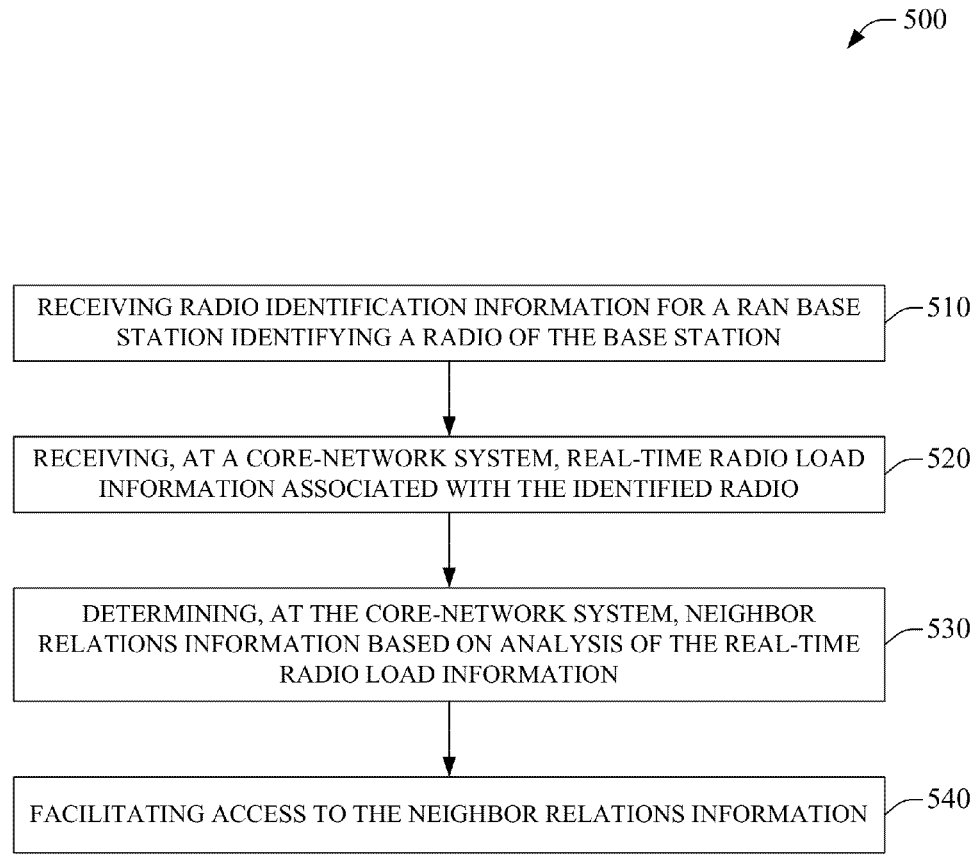
FIG. 5 illustrates a method facilitating modification of neighbor relations based on centralized determination of load conditions of neighbor base stations in accordance with aspects of the subject disclosure.

FIG. 5 illustrates aspects of method 500 facilitating modification of neighbor relations based on centralized determination of load conditions of neighbor base stations in accordance with aspects of the subject disclosure. At 510, radio identification information for a RAN base station can be received. Radio identification information can include identification information for a wireless network base station, e.g., an eNodeB, etc. Identification information can include a PCI, a GCI, etc.

Radio identification information can further include neighbor relations information, e.g., neighbor base station relation information such as an ANR data structure in an LTE environment, etc. An ANR data structure can include information describing the topological relations of neighbor base stations of a wireless communications network. An ANR data structure can be, for example, in the form of a list, a table, etc. As an example, an ANR table can include information describing the topology of base stations neighboring a serving base station. Where, in the example, there are several neighbor base stations, the ANR table can include the preferential selection order of the neighbor base stations to preferentially select neighbor base stations for UE handover as a UE exits the coverage area of a serving base station. Selection of a high performing base station for handover can decrease the likelihood that the handover will fail severing the communication link with the UE.

At 520, real-time radio load information associated with an identified radio can be received at a core-network system. Radio load information can include load information for a base station of a wireless communications network. In an aspect, radio identification information received at 510 can be employed to request radio load information corresponding to an identified base station.

At 530, method 500 can include determining, at the core-network system, neighbor relations information based on analysis of the real-time radio load information. Analysis can be related to a base station identified in radio identification information. As such, analysis can be related to base stations included in an ANR data structure. Analysis can include analysis to determine, for example, a high performing base station, ranking a base station, determining a poor performing base station, identifying a base station for a 'black list' or a 'white list', etc.

In an aspect, load analysis can employ key performance indicators (KPIs). KPIs can include, but are expressly not limited to, X2 load, S1 load, instant outbound handovers, instant inbound handovers, etc. Further, load analysis can include weighting. Weighting can be applied to individual KPIs, to combined KPI analysis, or combinations thereof.

In an aspect, real-time profiles of base stations can be developed based on real-time load analysis. A base station profile can be made available in response to identification of a base station by way of receiving radio identification information at 510. The use of a profile can facilitate rapid access to real-time load analysis for an indicated base station. Centralized real-time load analysis can readily compile profiles for one or more base stations in a RAN. These base station profiles can then be readily accessed to modify neighbor reactions information. Centralization of profile compilation can be advantageous over de-centralized profile development, e.g., development of profiles at each eNodeB for neighbors. A centralized profile can also reflect more complete analysis of relevant information.

At 540, access to the neighbor relations information can be facilitated. At this point, method 500 can end. Neighbor relations information, determined at 530, can be employed, by way of access related to 540, to modify the preferential selection of a neighbor base station, add a base station, delete a base station, flag a base station, black-list or white-list a base station, etc. In an aspect, neighbor relations information can be associated with modification of an ANR data structure, e.g., an ANR list can be update to reflect new neighbor base stations, remove existing neighbor base stations, reorder base station selection preference order of the ANR list, etc.

Figure 6:
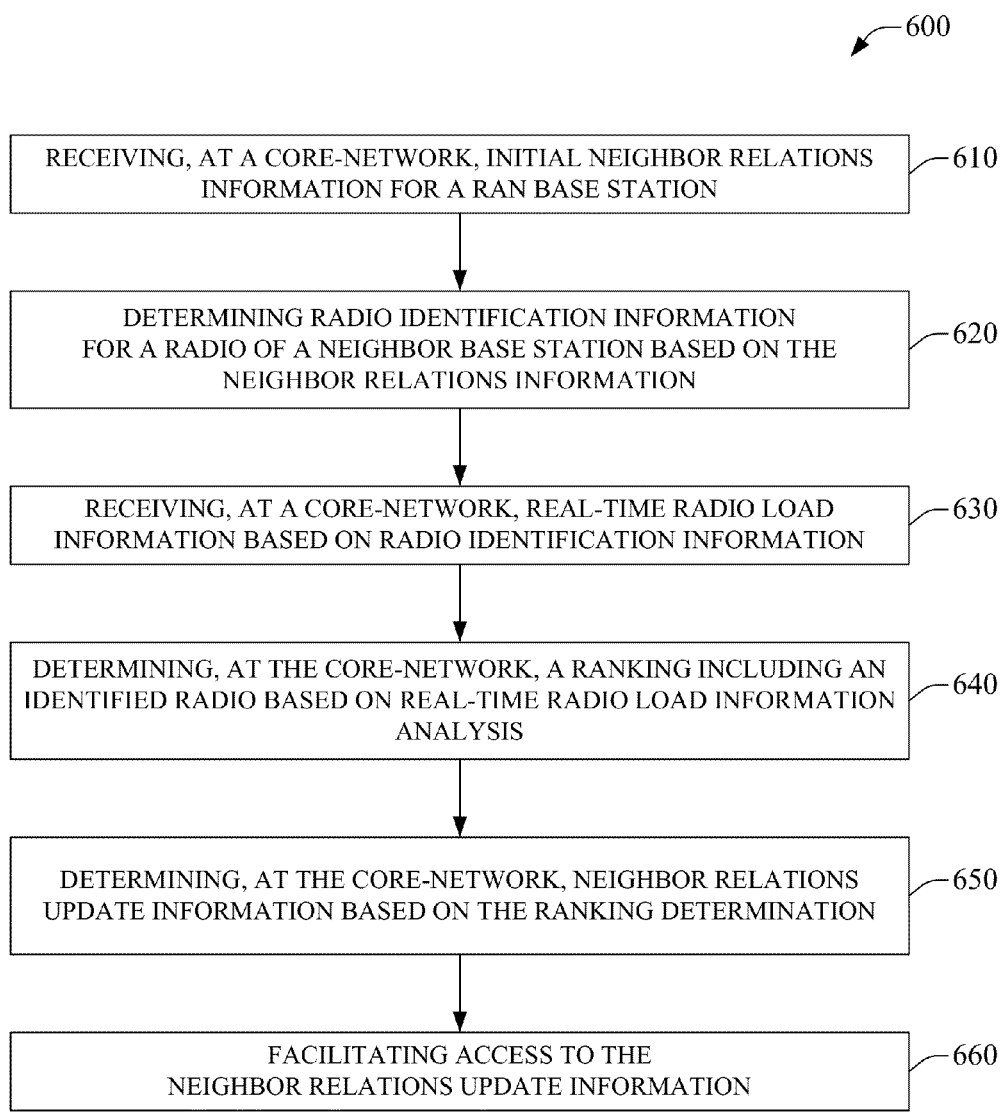
FIG. 6 illustrates a method facilitating modification of neighbor relations based on centralized determination of load conditions of neighbor base stations in accordance with aspects of the subject disclosure.

FIG. 6 illustrates aspects of method 600 facilitating modification of neighbor relations based on centralized determination of load conditions of neighbor base stations in accordance with aspects of the subject disclosure. At 610, method 600 can include receiving, at a core-network, initial neighbor relations information for a base station. Initial neighbor relations information received at 610 can describe the topological relationship between base stations of a RAN. Neighbor base station relation information can include an ANR data structure in an LTE environment, etc. An ANR data structure can include information describing the topological relations of neighbor base stations of a wireless communications network. An ANR data structure can be, for example, in the form of a list, a table, etc. As an example, an ANR table can include information describing the topology of base stations neighboring a serving base station. Where, in the example, there are several neighbor base stations, the ANR table can include the preferential selection order of the neighbor base stations to preferentially select neighbor base stations for UE handover as a UE exits the coverage area of a serving base station. Selection of a high performing base station for handover can decrease the likelihood that the handover will fail severing the communication link with the UE.

At 620, radio identification information can be determined for a radio of a neighbor base station based on the initial neighbor reactions information received at 610. Radio identification information can include identification information for a wireless network base station, e.g., an eNodeB, etc. Identification information can include a PCI, a GCI, etc.

At 630, real-time radio load information can be received at a core-network, based on radio identification information. Radio load information can include performance information for a base station of a wireless communications network. In an aspect, radio identification information determined at 620 can be employed to request radio load information corresponding to an identified base station.

At 640, determining, at the core network, a ranking including the base station can be based on analysis of real-time radio load information received at 630. Analysis can be related to the base station identified in radio identification information from 620. As such, analysis can be related to base stations included in an ANR data structure. Analysis can include determining a ranking based on, for example, a high performance of a base station, a poor performance of a base station, placement of a base station on a 'black list' or a 'white list', etc. In an aspect, load analysis can employ KPIs as disclosed herein. Further, load analysis can include weighting. Weighting can be applied to individual KPIs, to combined KPI analysis, or combinations thereof.

At 650, method 600 can include determining, at the core-network, neighbor relations update information based on base station ranking determination at 640. Neighbor relations update information can reflect the ranking of base stations at 640. As such, modification of neighbor relations information based on neighbor relations update information can adapt the topology of based stations comprising RAN to preferentially select base stations for RAN events, including handover of UEs and establishing communication links, to reflect the ranking determined at 640 based on the load information analysis.

At 660, access to the neighbor relations information can be facilitated. At this point, method 600 can end. Neighbor relations information, determined at 650, can be employed, by way of access related to 660, to modify the preferential selection of a neighbor base station, add a base station, delete a base station, flag a base station, black-list or white-list a base station, etc. In an aspect, neighbor relations information can be associated with modification of an ANR data structure, e.g., an ANR list can be update to reflect new neighbor base stations, remove existing neighbor base stations, reorder base station selection preference order of the ANR list, etc.

Figure 7:
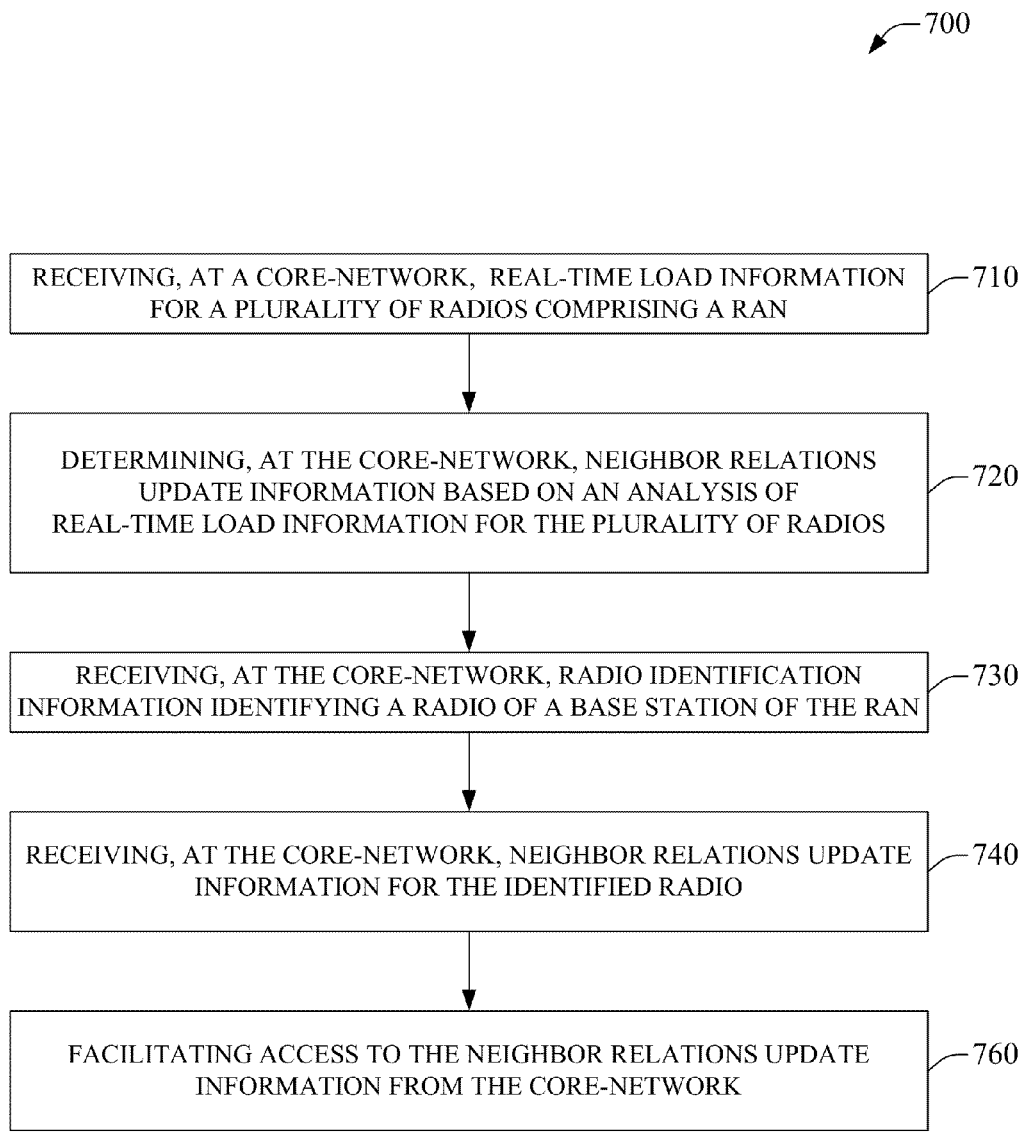
FIG. 7 illustrates a method for facilitating centralized monitoring of RAN load conditions and modification of neighbor relations based on centralized determination of load conditions of neighbor base stations in accordance with aspects of the subject disclosure.

FIG. 7 illustrates a method 700 that facilitates centralized monitoring of RAN load conditions and modification of neighbor relations based on centralized determination of load conditions of neighbor base stations in accordance with aspects of the subject disclosure. At 710, real time load information for a plurality of RAN-level radios can be received at a core-network. In an aspect, radios serviced by the core-network can actively report load information in real-time to the core-network. The core-network systems can, for example, act as a real-time reporting hub for load data from the plurality of radios deployed in a RAN associated with the core-network.

At 720, method 700 can include determining, at the core-network system, neighbor relations information based on analysis of the real-time radio load information for the plurality of radios at 710. In an aspect, the analysis of the real-time load information for a plurality of radios can be represented as real-time profiles of base stations based on the real-time load analysis. As such, a base station profile, e.g., the instant results of the real-time analysis of the load information for that base station, can be received in response to a query identifying the base station. The use of a profile can facilitate rapid access to real-time load analysis for the plurality of radios. As such, centralized load analysis can readily compile profiles for one or more radios in a RAN. Centralization of profile development in core-network components can be advantageous over distributing profile development in a RAN-level environment in that, for example, centralized profile development is resource efficient because base station profiles are not duplicated across multiple base stations, a base station profile will be the same even when accessed by multiple requestors (no synchronization of profile instances among different base stations), etc. A centralized profile can also reflect more complete analysis of relevant information in that the performance of the base station can be compiled based on the interaction of the base station with numerous neighbor base stations in contrast to a local profiles at each eNodeB that can be subject to more limited access to information, e.g., only basing the local profile on interaction with a subset of all the neighbor base stations of the profiled base station.

In an aspect, load analysis can employ key performance indicators (KPIs). KPIs can include, but are expressly not limited to, X2 load, S1 load, instant outbound handovers, instant inbound handovers, etc. Further, load analysis can include weighting. Weighting can be applied to individual KPIs, to combined KPI analysis, or combinations thereof.

At 730, radio identification information can be received at the core-network identifying a radio of a RAN base station, e.g., an eNodeB, etc. Identification information can include a PCI, a GCI, etc. Radio identification information can further include neighbor relations information, such as an ANR data structure. An ANR data structure can include information describing the topological relations of neighbor base stations of a wireless communications network.

At 740, neighbor relations update information for the radio identified at 730 can be received, at the core-network, based on analysis of the real-time radio load information at 720.

At 750, access to the neighbor relations information can be facilitated. At this point, method 700 can end. Neighbor relations information, determined at 730, can be employed, by way of access related to 750, to modify the preferential selection of a neighbor base station, add a base station, delete a base station, flag a base station, black-list or white-list a base station, etc. In an aspect, neighbor relations information can be associated with modification of an ANR data structure, e.g., an ANR list can be update to reflect new neighbor base stations, remove existing neighbor base stations, reorder base station selection preference order of the ANR list, etc.

Figure 8:
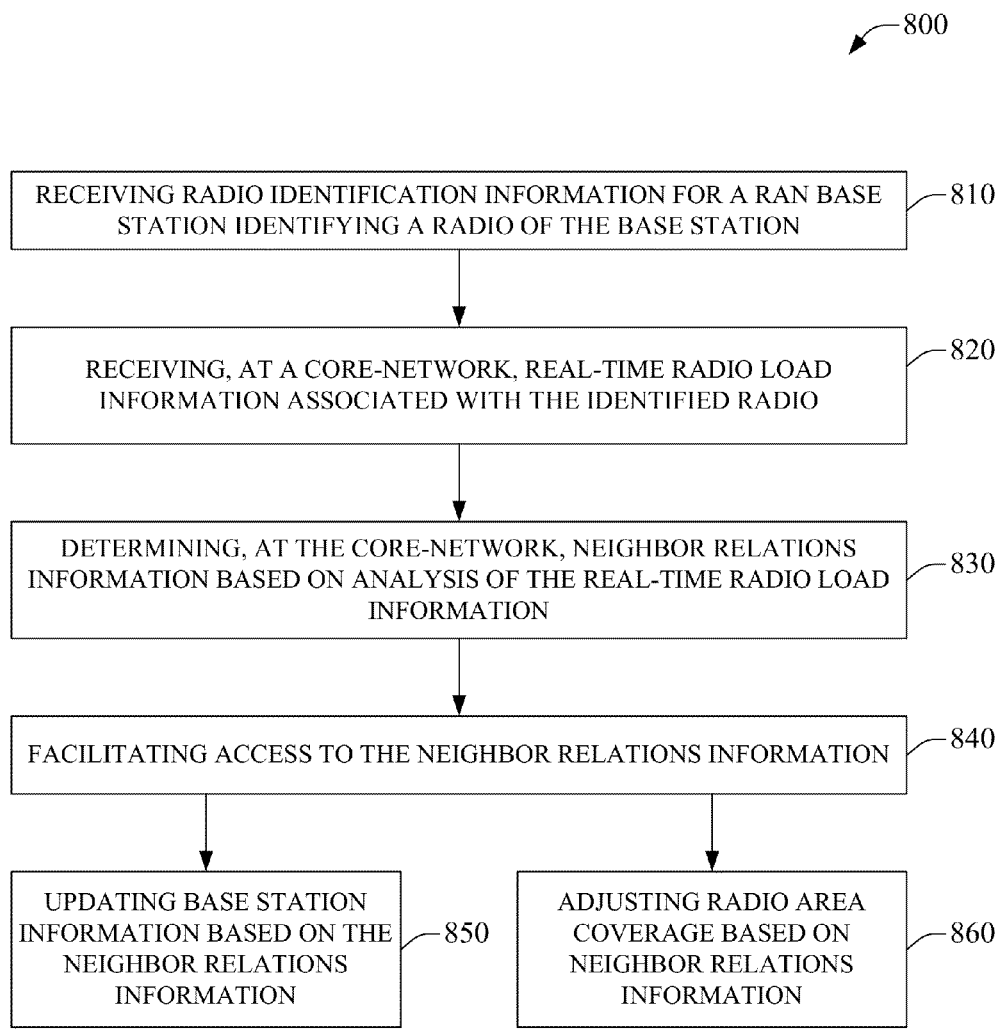
FIG. 8 illustrates a method for facilitating modification of neighbor relations based on centralized determination of load conditions of neighbor base stations, conflict resolution, and coverage area adjustment, in accordance with aspects of the subject disclosure.

FIG. 8 illustrates a method 800 that facilitates modification of neighbor relations based on centralized determination of load conditions of neighbor base stations, conflict resolution, and coverage area adjustment, in accordance with aspects of the subject disclosure. At 810, radio identification information for a base station can be received. Radio identification information can include identification information for a wireless network base station, e.g., an eNodeB, etc. Identification information can include a PCI, a GCI, etc. Radio identification information can further include neighbor relations information, such as an ANR data structure. An ANR data structure can include information describing the topological relations of neighbor base stations of a wireless communications network.

At 820, real-time radio load information can be received at a core-network. The real-time radio load information can be related to radio identification information at 810. Radio load information can include performance information for a base station of a wireless communications network. In an aspect, radio identification information received at 810 can be employed to request real-time radio load information corresponding to an identified radio of a base station in a RAN.

At 830, method 800 can include determining neighbor relations information based on analysis of the real-time radio load information. Analysis can be related to a base station identified in radio identification information. As such, analysis can be related to base stations included in an ANR data structure. Analysis can include analysis to determine, for example, a high performing base station, ranking a base station, determining a poor performing base station, identifying a base station for a 'black list' or a 'white list', etc. At 840, access to the neighbor relations information can be facilitated.

At 850, base station information can be updated based on the neighbor relations information. Neighbor relations information, determined at 830, can be employed, by way of access at 840, to modify the preferential selection of a neighbor base station, add a base station, delete a base station, flag a base station, black-list or white-list a base station, etc. In an aspect, neighbor relations information can be associated with modification of an ANR data structure, e.g., an ANR list can be update to reflect new neighbor base stations, remove existing neighbor base stations, reorder base station selection preference order of the ANR list, etc.

At 860, radio area coverage can be adjusted based on neighbor relations information. At this point, method 800 can end. Radio area coverage can be updated to change elevation, azimuth, transmission power, etc., or a radio of a base station. As an example, adaptation of radio coverage area of a base station can reduce overlap with other radio coverage areas of other radios. This, for example, can reduce interference between radios. Where neighbor relations are updated based on neighbor relations information, adjustment of a radio area coverage can be a desirable complimentary action, for example, where a base station is removed from neighbor relations, it can be desirable to adjust the coverage area of other neighbors to sufficiently cover portions of the area previously covered by the removed base station.

Figure 9:
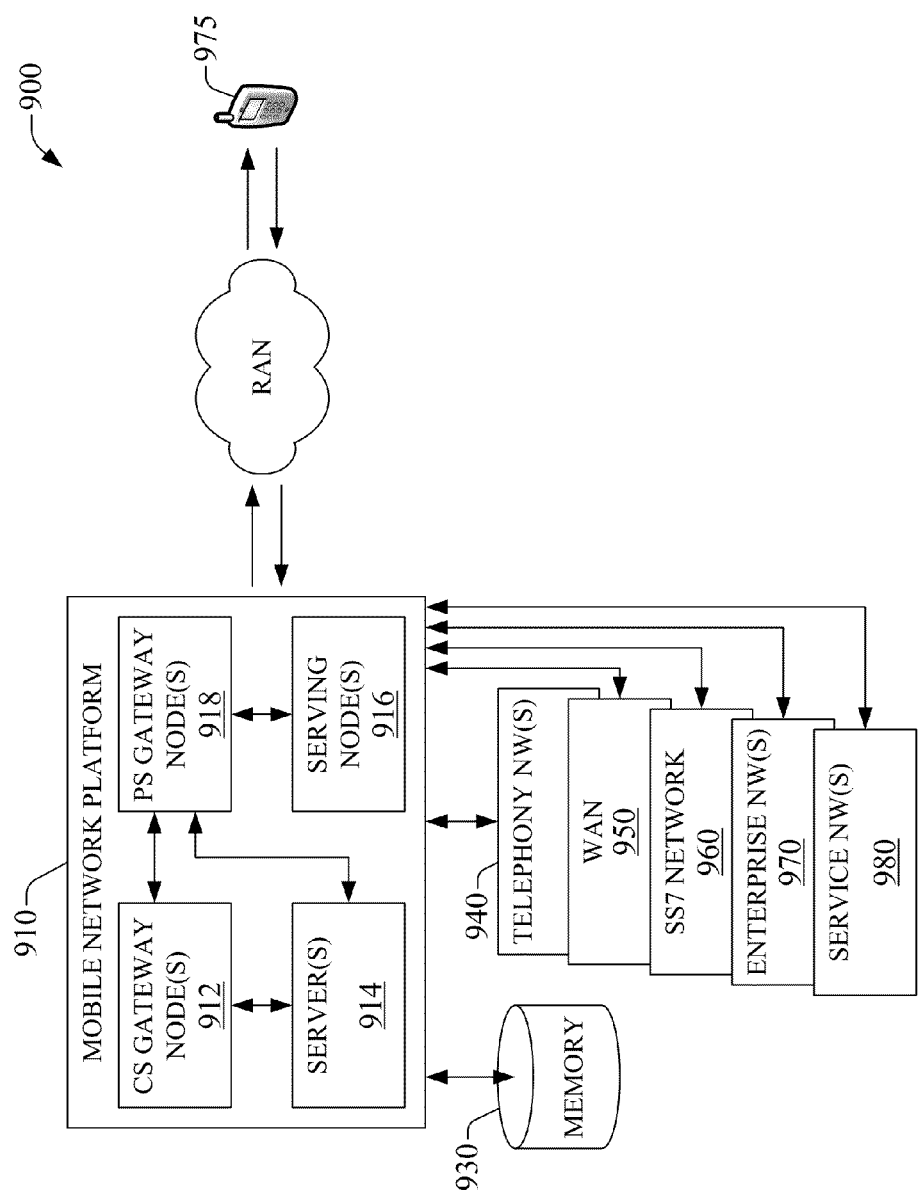
FIG. 9 is a block diagram of an example embodiment of a mobile network platform to implement and exploit various features or aspects of the subject disclosure.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 970. Circuit switched gateway node(s) 912 can authorize and authenticate traffic (e.g., voice) arising from such networks. Additionally, CS gateway node (s) 912 can access mobility, or roaming, data generated through SS7 network 970; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 960 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore. In an example embodiment, CLAC 110, 210, 310, 410, etc., can be included on server 914.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 960, or SS7 network 970.

Figure 10:
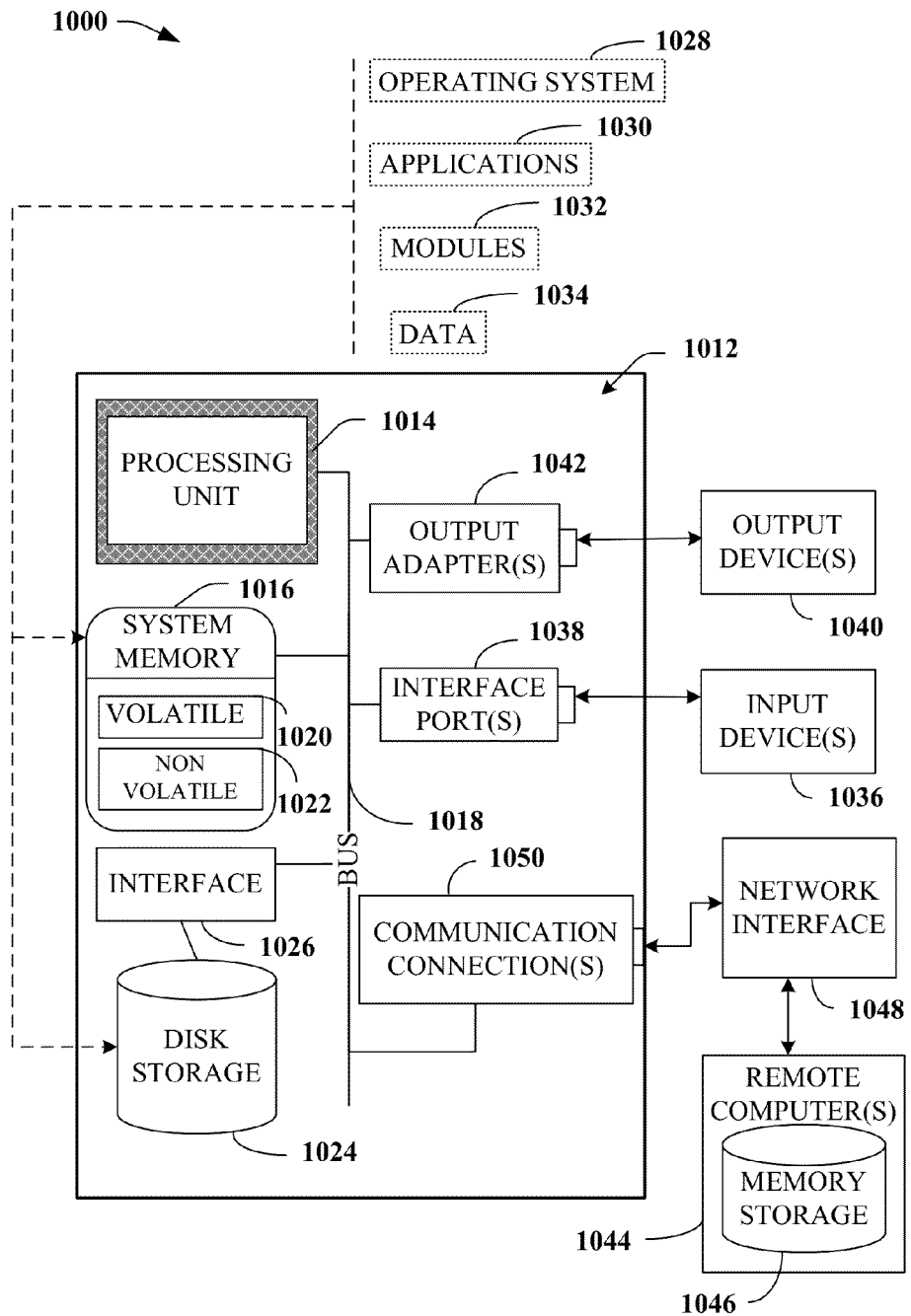
FIG. 10 illustrates a block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of the hardware of a mobile reporting component or UE (e.g., UE 412), part of a core-network component or system (e.g., CLAC 110, 210, 310, 410), a RAN component (e.g., base station 220, 320, 420, 430, 440, 450, etc.), etc., includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1016 can include volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, mobile reporting component 250 can include a user interface embodied in a touch sensitive display panel allowing a user to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "Node B," "evolved Node B (eNode B)," "home Node B (HNB)," "home access point (HAP)," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a memory that stores executable instructions; and
a processor, coupled to the memory, wherein the processor facilitates control of base station devices of a wireless communications system and facilitates execution of the executable instructions to perform operations, comprising:
receiving radio information related to an identification of a radio in the wireless communications system;
receiving current performance information related to the radio;
determining an update for neighbor base station relation information, based on an analysis of the current performance information, to facilitate an adaptation of a coverage area of the wireless communication system comprising a change in an antenna elevation, wherein the adaptation of the coverage area is based on relation information for a set of neighbor base station relations, and wherein the adaptation of the coverage area reduces a lost coverage area associated with removal of a base station device from the wireless communications system; and
facilitating access to the update for the neighbor base station relation information.

2. The system of claim 1, wherein the neighbor base station relation information is stored in a data structure including data representing the set of neighbor base station relations and the update for the neighbor base station relation information facilitates a modification of the data.

3. The system of claim 1, wherein the adaptation of the coverage area includes management of a data structure including data representing the set of neighbor base station relations including a deletion of an identity of a neighbor base station from the data representing the set of neighbor base station relations.

4. The system of claim 1, wherein the adaptation of the coverage area includes management of a data structure including data representing the set of neighbor base station relations including an addition of an identity of a neighbor base station to the data representing the set of neighbor base station relations.

5. The system of claim 1, wherein the adaptation of the coverage area includes management of a data structure including data representing the set of neighbor base station relations including a prioritization of an identity of a neighbor base station the data representing of the set of neighbor base station relations.

6. The system of claim 1, wherein the current performance information includes a value related to a loading of a communicative link between a first base station and a second base station.

7. The system of claim 1, wherein the current performance information includes a value related to a loading of a communicative link between a base station and a core-network component.

8. The system of claim 1, wherein the historical performance information includes a value related to an outgoing handover of a user equipment from the radio.

9. The system of claim 1, wherein the historical performance information includes a value related to an incoming handover of a user equipment to the radio.

10. The system of claim 1, wherein the update is determined in part by a first application of a predetermined rule, related to a predefined performance of the radio, to the current performance information.

11. The system of claim 10, wherein the update is determined in part by a second application of the predetermined rule to the current performance information, wherein the current performance information includes a first performance indicator and a weighted second performance indicator weighted second performance indicator that applies a weighting factor that adjusts an effect of the weighted second performance indicator in the second application of the predetermined rule relative to the first performance indicator in the first application of the predetermined rule.

12. A method, comprising:
receiving, by a system including a processor and facilitating control of a plurality of base station devices of a wireless communications network, radio identification information for a base station device of the wireless communications network, wherein the base station device is a neighbor base station device to a serving base station device;
receiving, by the system, current performance information related to the base station device;
determining, by the system, an update for a neighbor base station relation information, based on analyzing the substantially current performance information;
facilitating, by the system, adapting a coverage area of the wireless communication system comprising a change in an antenna azimuth, wherein the adapting the coverage area is based on the update and relation information for a set of neighbor base station relations, and wherein the adapting the coverage area reduces a loss of the coverage area associated with removal of the base station device from the wireless communications system; and
facilitating, by the system, access to the update for the neighbor base station relation information.

13. The method of claim 12, wherein the analyzing the current performance information includes analyzing a value related loading of a communicative link between a first base station device and a second base station device.

14. The method of claim 12, wherein the analyzing the current performance information includes analyzing a value related to loading of a communication link between a base station device and a core-network component.

15. The method of claim 12, wherein the determining the update includes applying a predetermined rule, related to a predefined performance of the radio, to the current performance information.

16. The method of claim 12, wherein the facilitating the adapting of the coverage area includes facilitating deleting the first base station device from, or facilitating the adding the first base station device to, a data structure representing the set of neighbor base station relations.

17. The method of claim 12, wherein the facilitating the adaptation of the coverage area includes facilitating prioritizing a neighbor base station device represented in a data structure defining the set of neighbor base station relations.

18. A device, comprising:
 a memory that stores executable instructions; and
 a processor that facilitates control of base station devices of a wireless communications network, coupled to the memory, that facilitates execution of the executable instructions to perform operations, comprising:
  receiving updated performance information related to a plurality of radios of the wireless communications network;
  determining an update for neighbor base station relation information, based on an analysis of the updated performance information, to facilitate an adaptation of a topology of the wireless communication system comprising a change in an antenna azimuth and in the antenna elevation, wherein the adaptation of the topology is based on a set of neighbor base station relations, and wherein the adaptation of the topology modifies a first coverage area of a base station device to reduce a loss of a second coverage area associated with removal of another base station device from the wireless communications network;
  receiving radio information related to identification of a radio of the plurality of radios of the wireless communications system;
  receiving a subset of the update for neighbor base station relation information, the subset related to the identified radio of the plurality of radios; and
  facilitating access to the subset of the update for neighbor base station relation information.

19. The device of claim 18, wherein the update is determined in part by application of a predetermined rule to the updated performance information.

20. The device of claim 18, wherein the update for neighbor base station relation information is determined based on a determination of a priority of the base station device with regard to another base station device, the neighbor base station relation information is stored in a data structure representing the set of neighbor base station relations, and the update for the neighbor base station relation information facilitates a modification of the data structure to include information representative of the determination of the priority.

* * * * *